United States Patent [19]

Clark

[11] 4,114,429
[45] Sep. 19, 1978

[54] METHOD OF AND APPARATUS FOR SENSING STRAIN IN STRAINED MEMBERS

[75] Inventor: John Campbell Clark, Newport, England

[73] Assignee: Coal Industry (Patents) Limited, London, England

[21] Appl. No.: 722,605

[22] Filed: Sep. 13, 1976

[30] Foreign Application Priority Data

Oct. 28, 1975 [GB] United Kingdom ............... 44324/75

[51] Int. Cl.² .................................................. G01B 7/16
[52] U.S. Cl. ................................................. 73/88.5 R
[58] Field of Search ....................... 73/88.5 R, 141 A; 338/6

[56] References Cited

U.S. PATENT DOCUMENTS

| | | | |
|---|---|---|---|
| 2,332,288 | 10/1943 | Zeitlin | 73/88.5 R |
| 2,350,927 | 6/1944 | Ruge | 73/88.5 R X |
| 2,801,388 | 7/1957 | Ruge | 73/88.5 R X |
| 2,933,921 | 4/1960 | Gloor | 73/141 A X |
| 3,197,697 | 7/1965 | McCauley | 73/88.5 R X |
| 3,680,365 | 8/1972 | Summers | 73/141 A X |
| 3,728,700 | 4/1973 | Duval | 73/88.5 R X |
| 3,780,817 | 12/1973 | Videon | 73/88.5 R X |

OTHER PUBLICATIONS

Glanzer – "Jigging for Better Welds" – The Welding Engineer – Dec. 1948 – pp. 44–48.

*Primary Examiner*—Charles A. Ruehl
*Attorney, Agent, or Firm*—James C. Wray

[57] ABSTRACT

The strain in a member is sensed by a strain sensitive device mounted on mounting block means which when fixedly secured to the member include a removable template.

4 Claims, 6 Drawing Figures

METHOD OF AND APPARATUS FOR SENSING STRAIN IN STRAINED MEMBERS

This invention relates to methods of and apparatus for sensing strain in strained members.

In particular, although not exclusively, the invention relates to methods of and apparatus for sensing strain in an underground mine winder brake.

It has been proposed to bolt a strain sensitive device to a member in order to sense strain in the member when deformed. However, such a proposal usually requires the drilling and tapping of bolt holes in the member after the member has been installed. Thus, the necessary machining has to be undertaken in inaccessible positions where it is frequently very difficult, if not impossible, to carry out such machining operations to the required high degree of tolerance. Consequently, the bolt holes tend not to be in the desired positions and the accuracy of the sensed strain in the member suffers. In addition, such a proposed technique does not provide a desired fixed contact between the strain sensitive device and the member. Consequently, the strain sensitive device tends not to be fixedly mounted on the member and the accuracy of sensing the strain suffers.

An object of the present invention is to provide an improved method of, and apparatus for, sensing strain in a strained member.

According to one aspect of the present invention, a method of sensing strain in a strained member comprises fixedly securing mounting block means including a removable template to the member prior to the member being strained and then removing the template from the mounting block means and replacing it with a strain sensitive device for deriving a signal indicative of any subsequent strain existing in the member, the strain sensitive device being secured to the mounting block means.

Preferably, the mounting block means is welded to the member.

Advantageously, the signal is fed to an alarm device arranged to operate when the strain sensed by the strain sensitive device reaches a preselected value.

Conveniently, the apparatus comprises a safety device arranged to operate when the strain sensed by the strain sensitive device reaches a preselected value to override or control means straining the member.

According to a further aspect of the present invention, apparatus for carrying out the above defined method comprises mounting block means including a removable template and adapted to be fixedly secured to the member, and a strain sensitive device securable to the mounting block means when the template has been removed.

Preferably, the mounting block means comprises two mounting block units with the template arranged to bridge the two units.

Advantageously, the strain sensitive device includes at least one strain gauge arranged to derive a signal indicative of strain in the member.

Conveniently, the apparatus includes an alarm arranged to operate when the sensed strain reaches a preselected value.

Advantageously, the apparatus includes a safety device arranged to operate when the sensed strain reaches a preselected value to override or control means straining the member.

According to another aspect of the invention apparatus for sensing strain in a strained member, comprises a strain sensing device including a strain element arrangeable to be strained with the strained member such that the strain in the element is proportional to the strain in the member, and at least one strain gauge secured to the strain element, the strain element having a preselected profile such that the magnitude of strain element is magnified adjacent to the or each strain gauge.

Conveniently, the strain element comprises a plate with the or at least one of the strain gauges secured around an inner wall of a hole formed in the plate.

Preferably, at least one recess is formed in the plate adjacent to the or each strain gauge to magnify the magnitude of the strain adjacent to the strain gauge.

Advantageously, the plate is rectangular or square, the hole being circular and being formed in the centre of the plate with four strain gauges secured around the inner curved wall of the hole, the strain gauges being arranged generally in line with the edges of the plate, respectively.

Conveniently, four further holes are formed in the plate, each further hole being intermediate the adjacent ends of two of the strain gauges.

Preferably, slots are formed from adjacent edges of the plate to said further holes, respectively.

By way of example only, one embodiment of the present invention will now be described with reference to the accompanying drawings, in which.

Figure 1:
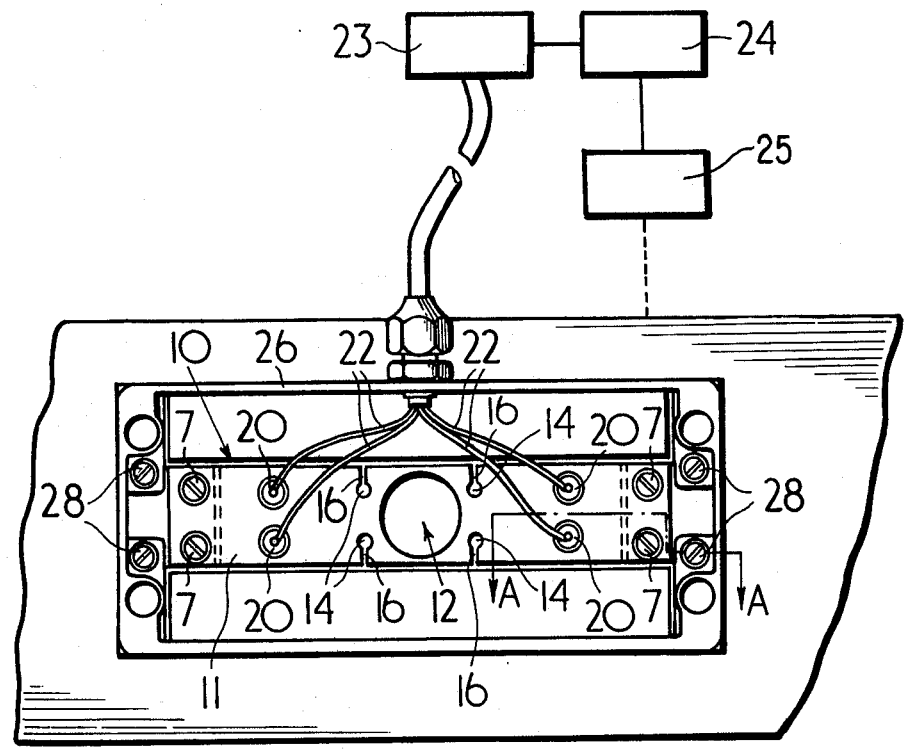
FIG. 1 is a plan of apparatus for sensing strain in a member, shown with its lid removed.
Figure 2:
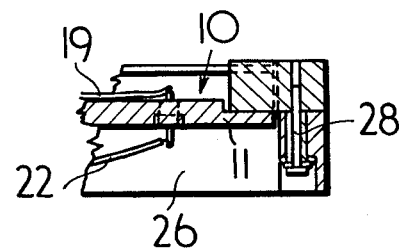
FIG. 2 is a sectional view along line A—A of FIG. 1.
Figure 3:
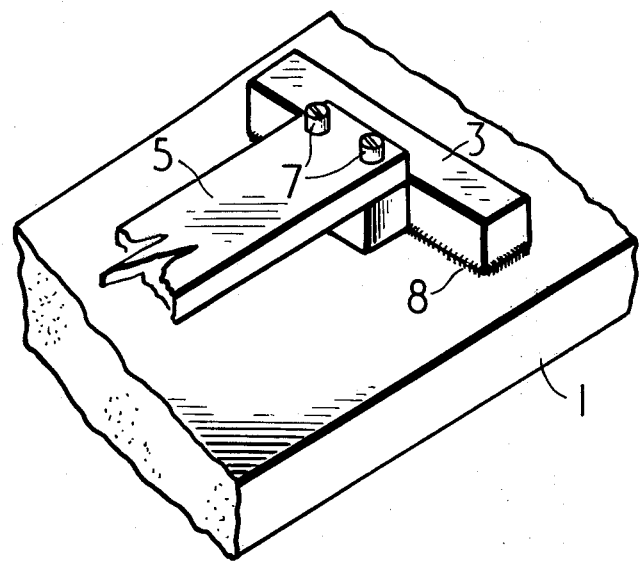
FIG. 3 is a scrap perspective view of a part of mounting block means mounted on the member.
Figure 4:
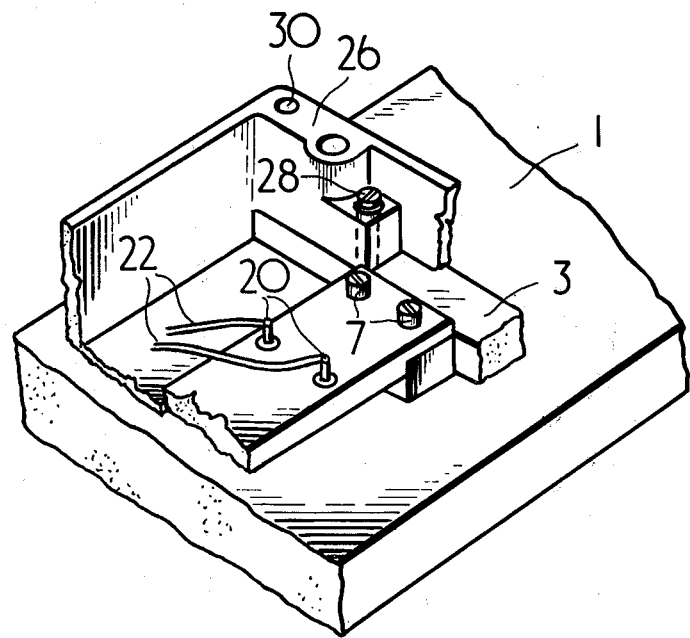
FIG. 4 is a scrap perspective view of a portion of the apparatus of FIG. 1 shown mounted to a mounting block unit constituted by a part of the mounting block means of FIG. 3.

Referring to the drawings, apparatus for sensing strain in a strained member 1 (see FIGS. 3 and 4) for example a mine winder brake member, includes mounting block means comprising two mounting block units 3 (only one of which is shown in FIGS. 3 and 4) bridged by a removable template 5 (see FIG. 3) secured to the mounting block units by bolts 7. In use the mounting block means is fixedly secured to the member 1 by means of for example, welding 8, the template may then be removed and replaced by a strain element 10 which is secured to the mounting block units by the bolts 7 and which is constituted by a rectangular plate 11 having a circular hole 12 formed in the centre of the plate and four further holes 14 formed around the central hole. Slots 16 are formed in the plate between the adjacent edges of the plate and said further holes, respectively.

Figure 5:
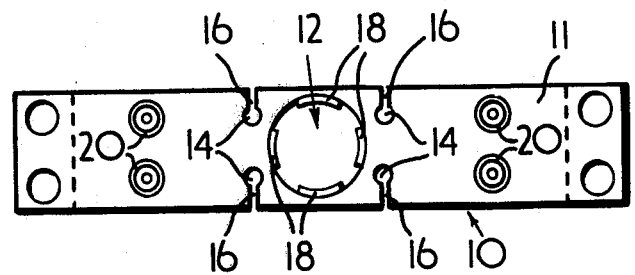
FIG. 5 is a plan of a detail of FIG. 1.
Figure 6:
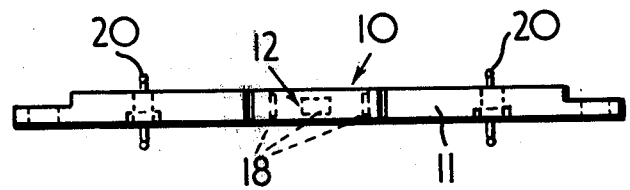
FIG. 6 is an end view of the detail of FIG. 5.

Four strain gauges 18 (see FIGS. 5 and 6) are secured around the curved inner wall of the central hole 12, each strain gauge being generally in line with an edge of the plate. As can be seen in FIG. 5 the further holes and slots are formed adjacent to the strain gauges such that when the strain element is strained the magnitude of the strain is magnified adjacent to the strain gauges. The further holes 14 are formed intermediate the adjacent ends of two strain gauges.

The strain gauges are electrically connected in the form of a Wheatstone Bridge and connections 19 (see FIG. 6) from the strain gauges are fed to four terminals 20 and then via connections 22 to alarm and safety devices 23, 24 arranged to operate when the sensed strain reaches a preselected magnitude safety device 24 is connected to override or control the means 25 straining the member 1.

A protective casing 26 is secured to the mounting block units and around the strain element 10 by bolts 28, the casing having a lid which is not shown in the drawings but which is secured to the casing by bolts (not shown) engaging in holes 30 (see FIG. 4).

In use, the mounting block means is first welded to the member 1 prior to it being strained. The template 5 is then removed from the mounting block units 3 and replaced by the strain element 10 and the casing 26. Finally the lid is secured to the casing.

The connection leads 22 from the strain gauges are connected to the alarm and/or safety devices which operate if the sensed strain in the member 1 reaches a preselected magnitude. Since the plate 11 of the strain element 10 is formed with holes 14 and slots 16 the strain in the plate 11 is magnified in the regions adjacent to the strain gauges. Consequently, the strain element 10 tends to be very sensitive to changes in strain magnitude. Hence the apparatus accurately and sensitively detects changes in the strain in the member 1.

Should the sensed strain reach the preselected magnitude the alarm device operates to warn an operator and the safety device overrides or controls the means straining the member 1.

In other arrangements the signal from the strain element 10 may be fed to monitor or recording equipment.

From the above description it can be seen that the present invention provides a simple effective method of and apparatus for sensing the strain in a strained member.

The present invention enables the mounting block means to be simply welded in position on the member, the block means being held rigidly in a desired position throughout welding by the template. Thus, no accurate marking and machining is required in inaccessible positions. Also, once the mounting block means are welded in position the template can easily be removed and replaced by the strain sensitive device which accurately engages the mounting block means and which are fixedly retained in the desired position relative to the strained member by the abutment shoulders. Thus, an effective connection is achieved between the mounting block means and the strain sensitive device enabling the device to accurately sense any strain in the member. With the present invention any high tolerance machining operations to the mounting blocks, template and strain sensitive device is done in a machine or workshop where the required tolerance can be achieved.

I claim:

1. A method of sensing strain in a strained member comprising accurately spacing mounting block means, removably securing the spaced mounting block means to a template, rigidly holding the mounting block means in accurately spaced desired positions on a member in which strain is to be sensed, fixedly securing the mounting block means including the removable template to the member in which strain is to be sensed prior to the member being strained, removing the template from the mounting block means which are fixedly secured to the member in which strain is to be sensed, and securing a strain sensitive device to the spaced mounting block means for deriving a signal indicative of any subsequent strain existing in the member.

2. A method as claimed in claim 1, in which the mounting block means is welded to the member.

3. A method as claimed in claim 2, in which the signal is fed to an alarm device arranged to operate when the strain sensed by the strain sensitive device reaches a preselected value.

4. A method as claimed in claim 2, in which the signal feeds to a safety device arranged to operate when the strain sensed by the strain sensitive device reaches a preselected value to override or control means straining the member.

* * * * *